United States Patent [19]
Cleaveland

[11] 3,967,163
[45] June 29, 1976

[54] SUPPORTING MEANS FOR THE POWER CONDUCTORS IN CIRCUIT BREAKERS

[75] Inventor: Charles M. Cleaveland, Irwin, Pa.

[73] Assignee: Westinghouse Electric Corporation, Pittsburgh, Pa.

[22] Filed: Feb. 4, 1974

[21] Appl. No.: 439,169

Related U.S. Application Data
[62] Division of Ser. No. 308,370, Nov. 21, 1972, abandoned.

[52] U.S. Cl................................. 317/112; 174/138 R; 200/48 R; 200/50 AA; 317/99; 317/103
[51] Int. Cl.²...................... H02B 1/04; H01B 17/00
[58] Field of Search.......... 200/48 R, 48 KB, 50 AA, 200/144 B, 146 R; 200/117 R, 148 A; 317/103, 99, 112, 114; 335/201; 174/148, 149, 150, 154, 158 R, 158 F, 138 R

[56] References Cited
UNITED STATES PATENTS

| | | | |
|---|---|---|---|
| 2,735,042 | 2/1956 | Hayford et al. | 317/99 |
| 2,914,627 | 11/1959 | Eichelberger et al. | 200/50 AA X |
| 2,914,635 | 11/1959 | Lester et al. | 200/50 AA X |
| 2,935,548 | 5/1960 | Kozinski | 174/138 R X |
| 3,004,116 | 10/1961 | Griscom | 200/48 R |
| 3,579,045 | 5/1971 | Keogh et al. | 200/50 AA X |
| 3,603,753 | 9/1971 | Erink | 200/50 AA X |
| 3,657,495 | 4/1972 | Charamel et al. | 200/48 R X |
| 3,783,208 | 1/1974 | Davies et al. | 200/50 AA |
| 3,793,494 | 2/1974 | Cleaveland | 200/50 AA |

*Primary Examiner*—James R. Scott
*Attorney, Agent, or Firm*—W. R. Crout

[57] ABSTRACT

An improved supporting means for the power conductor assemblies in circuit breakers is provided including one or more pairs of side-by-side post-insulators for insulatingly supporting one or more of the power conductor assemblies of the circuit breaker. Additionally, another pair of side-by-side post-insulators may be utilized to support one of the power-conductor assemblies from the grounded frame structure of the circuit breaker. Improved strength is provided by utilizing pairs of side-by-side post-type insulators and also cost reduction is remarkably achieved. Mounting bolts may be cast into the ends of the post-type insulators, such as formed of porcelain, for example, to support suitable hardware, such as metallic channel members, for example, to accommodate the power-conductor assemblies.

The pairs of side-by-side post-insulators may be arranged in front-to-back relationship, that is in the direction longitudinally of the power-conductor assembly, or, alternatively, the pair of side-by-side post-insulators may be disposed laterally of each other, that is generally transversely of the longitudinal direction of the power conductor assembly for the circuit interrupter.

12 Claims, 34 Drawing Figures

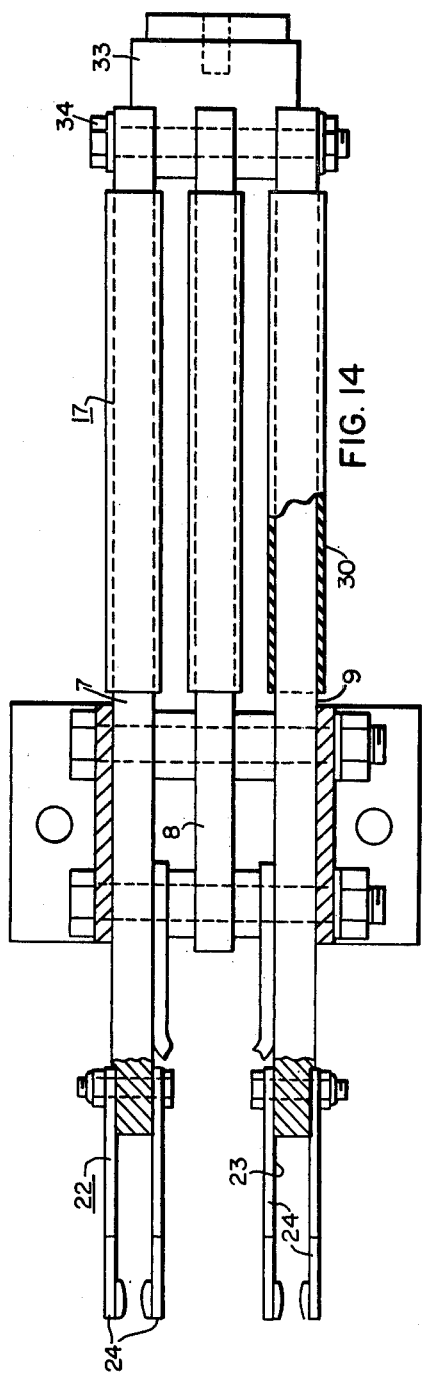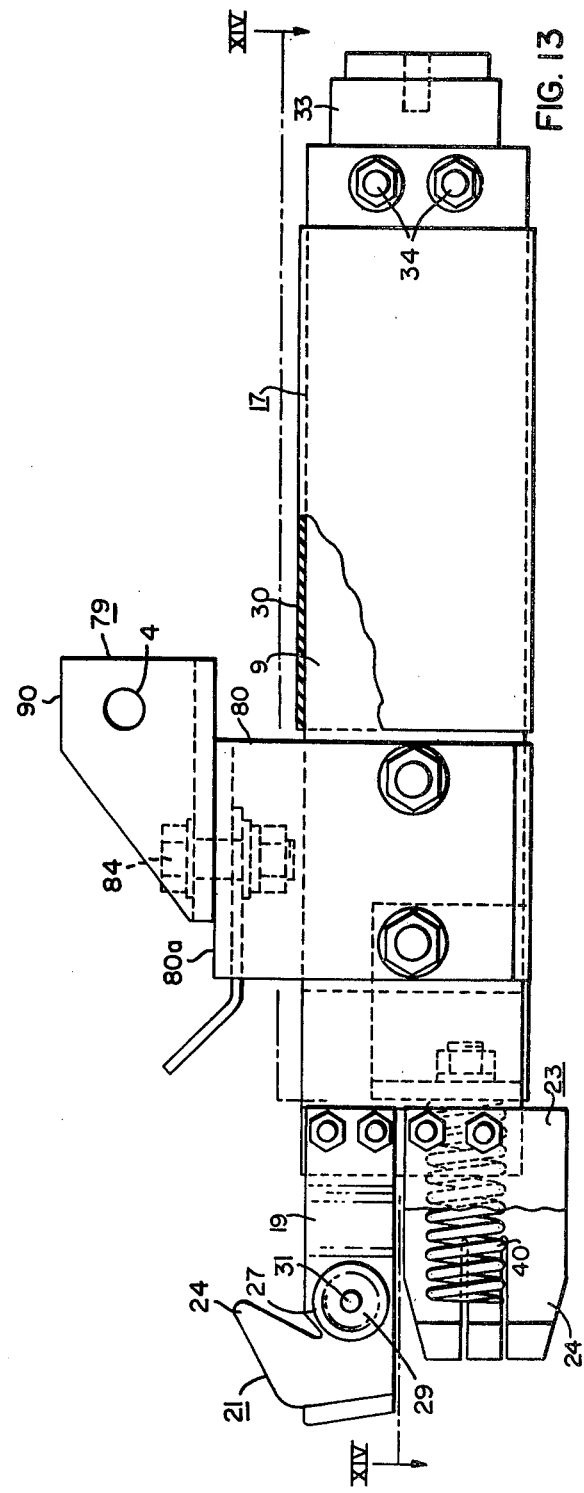

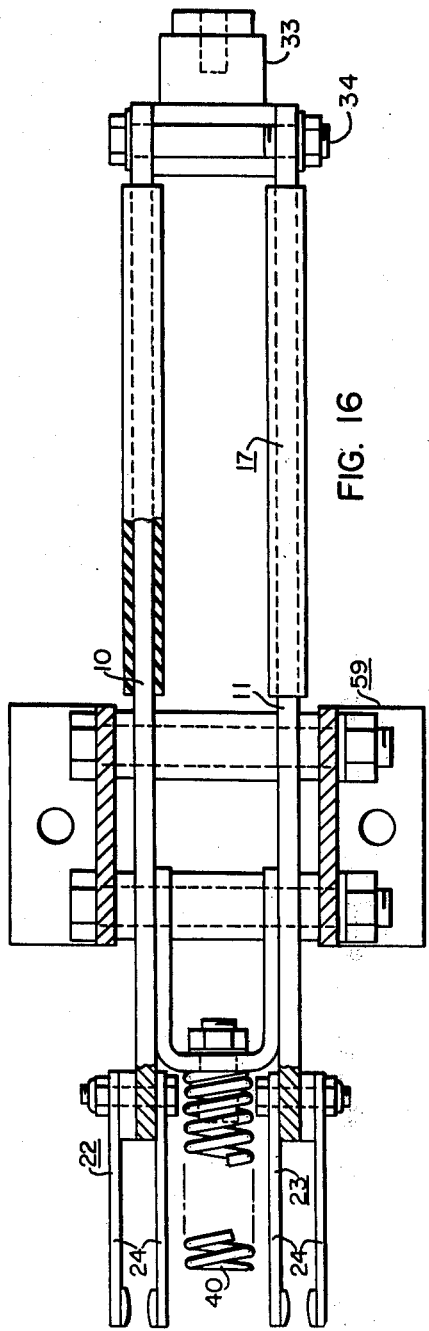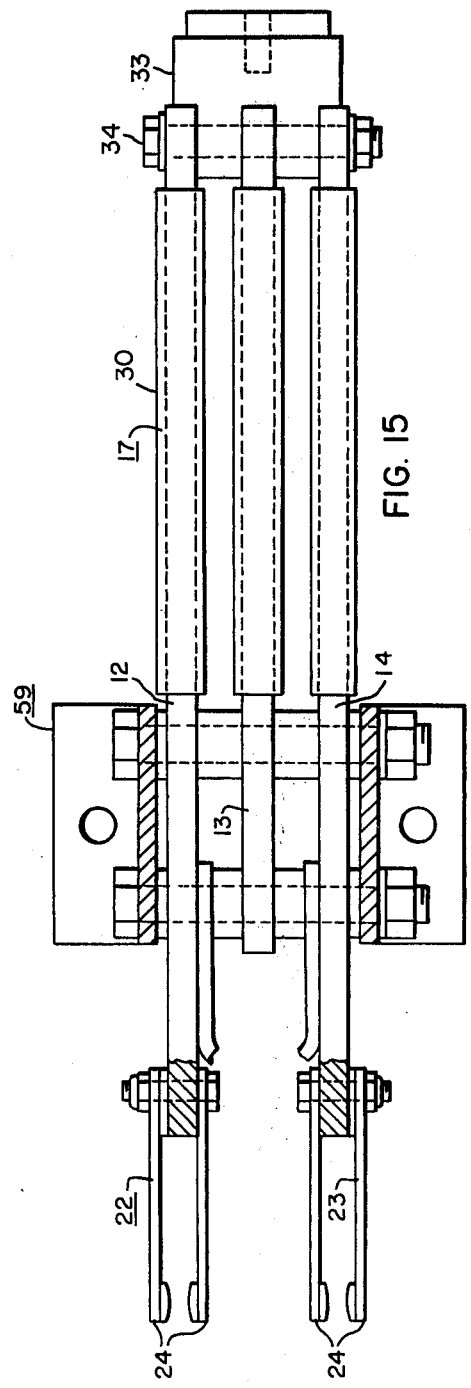

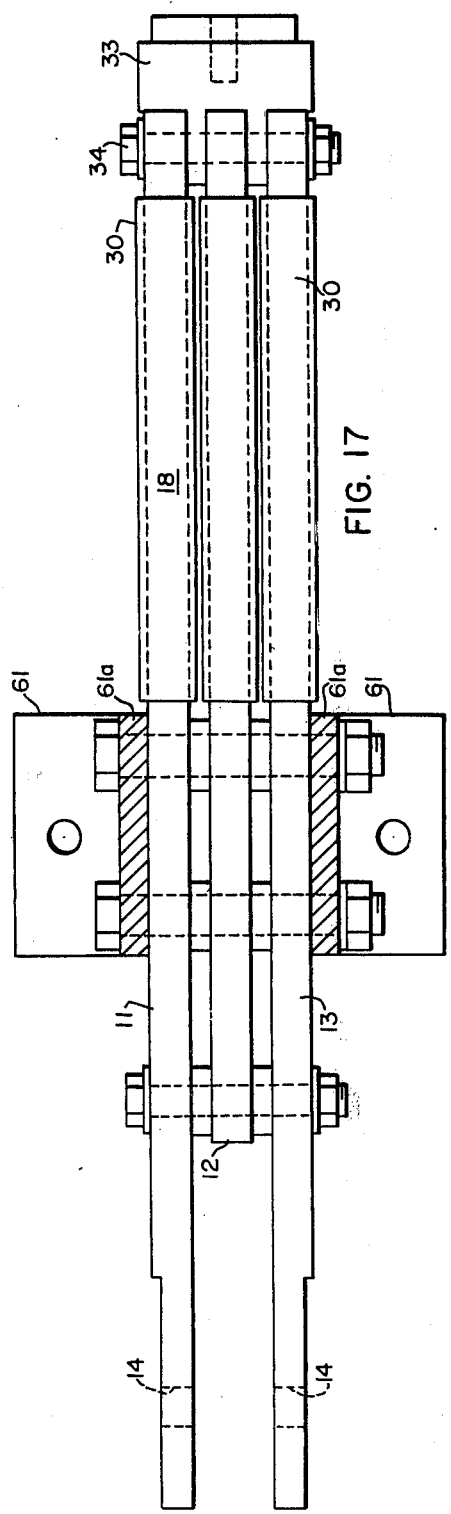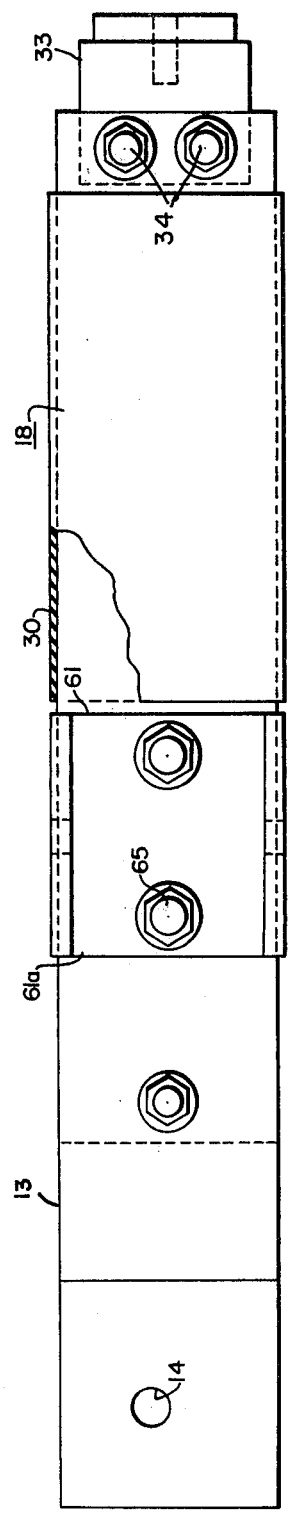
FIG. 17
FIG. 18

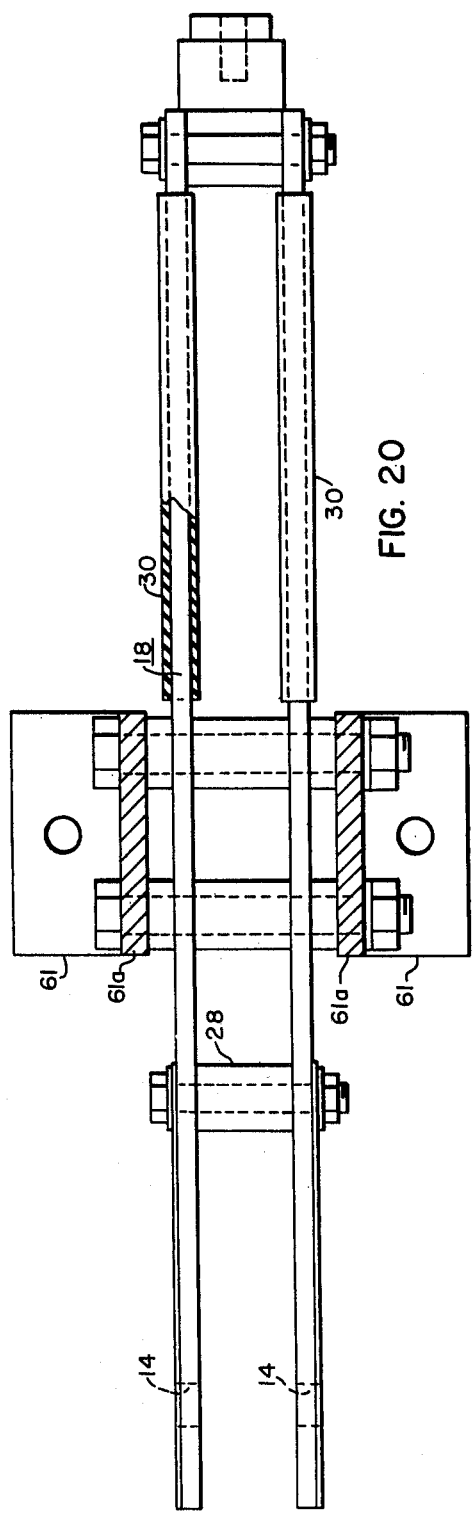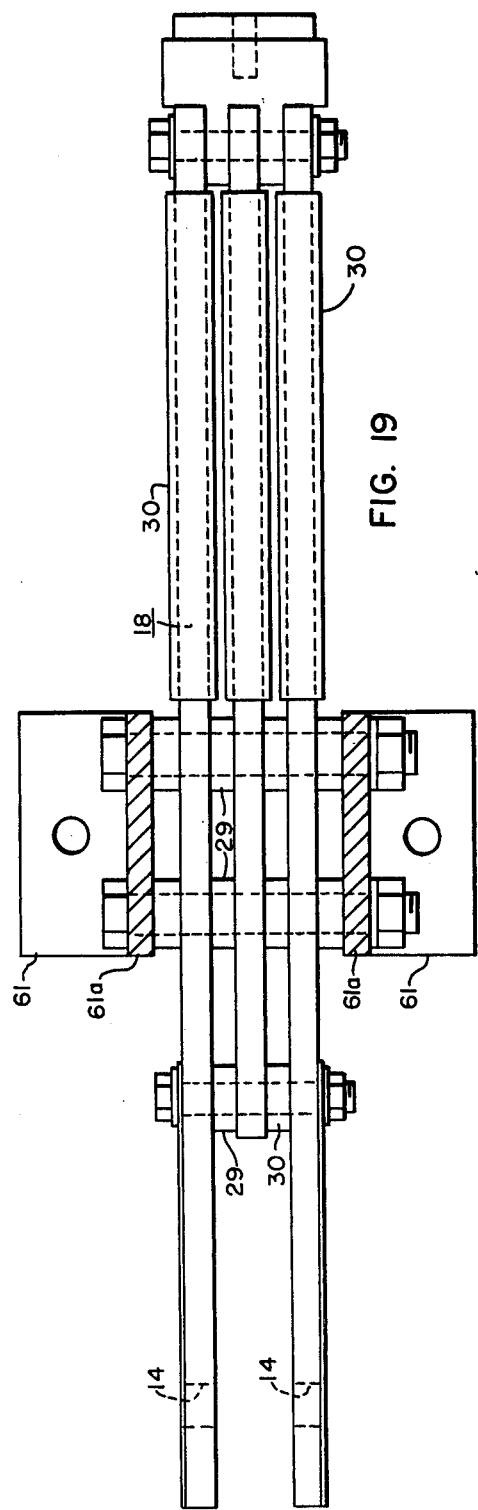

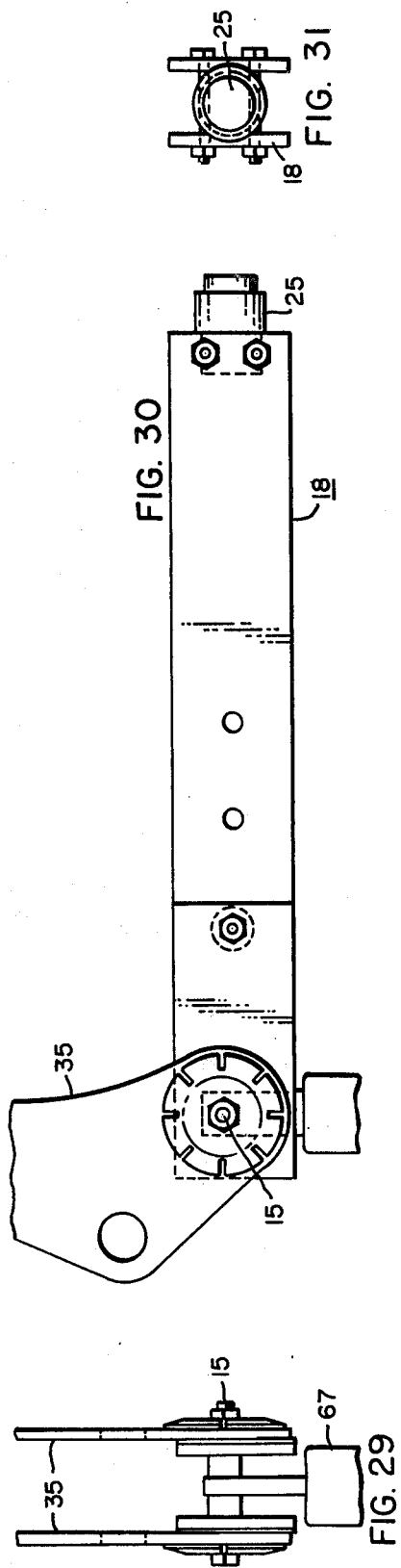
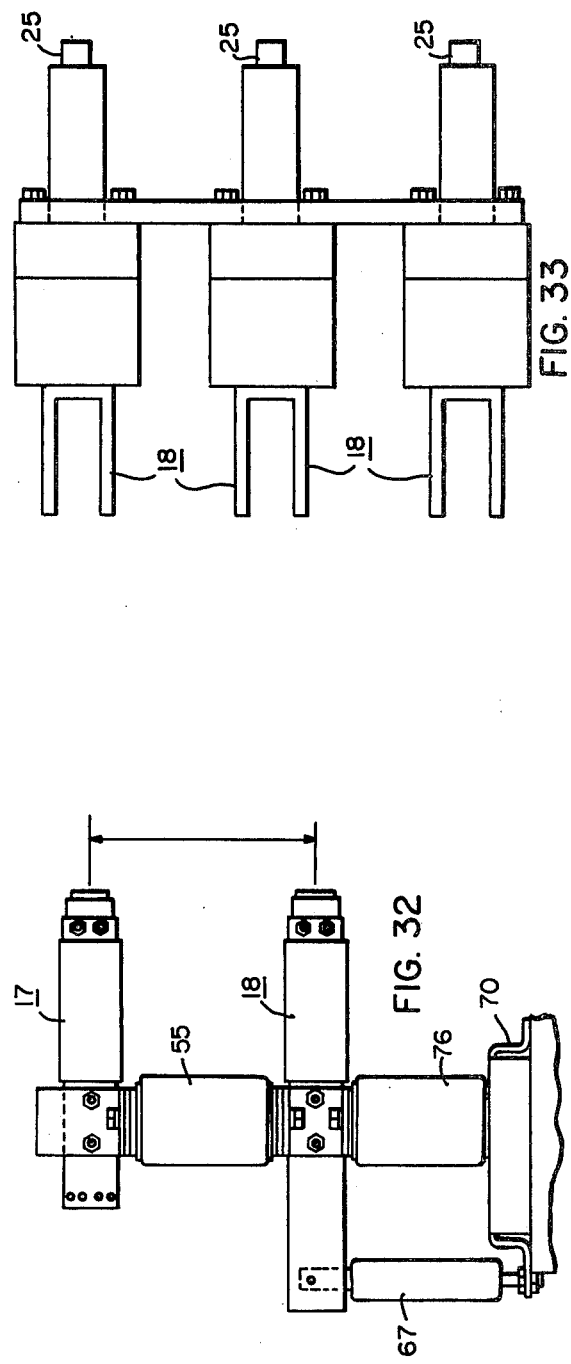

SUPPORTING MEANS FOR THE POWER CONDUCTORS IN CIRCUIT BREAKERS

This application is a divisional patent application of my parent application filed Nov. 21, 1972, Ser. No. 308,370, now abandoned entitled, "Improved Air-Type Circuit-Interrupters Using Rectangular Bars For Conductor Assemblies", and assigned to the assignee of the instant patent application.

CROSS-REFERENCE TO RELATED APPLICATION

Applicant is not aware of any related patent application pertinent to the present invention other than a second divisional patent application filed Jan. 16, 1974 Ser. No. 433,960 entitled "Improved Power-Conductor Assembly and Insulating Supporting Means Therefor", and application Ser. No. 498,499, filed Aug. 19, 1974, which is a continuation of the abandoned parent application Ser. No. 308,370. The abandoned parent and copending continuation applications are assigned to the same assignee as the instant second divisional patent application.

An additional patent application, pertinent to the present invention, and illustrating horizontal vertically-spaced power bus-bar elements is U.S. patent applicaation, Ser. No. 466,746, filed May 3, 1974, by Charles M. Cleaveland, entitled "Improved Circuit-Breakers Having Horizontal Spaced Conductors and Simplified Supporting Means," and assigned to the assignee of the instant patent application.

Still a further patent application, pertinent to the instant subject matter, is U.S. patent application filed Nov. 8, 1974, Ser. No. 522,192, by Richard J. Burgoon, covering novel adjustment means, utilized in connection with spaced vertical-plate power bus-bar elements, the structure being similar to that of the foregoing Cleaveland patent application, Ser. No. 466,746, and likewise assigned to the assignee of the instant patent application.

BACKGROUND OF THE INVENTION

Air-break circuit interrupters of the prior art have generally used heavy insulating members for supporting the power-conductor assemblies, as for example, set forth in the U.S. Pat. No. 3,437,554 issued Apr. 8, 1969 to James Gamble and assigned to the assignee of the instant application. Also insulating plates have heretofore been used in the art, as well as other insulating members of plate-like construction. In some instances bushings having flange portions have been passed through suitable apertures provided in metallic frame plates, and the flange portions have been bolted to the peripheries of the holes provided in the metallic-frame members.

As well known by those skilled in the art, air-break circuit interrupters are available in a wide variety of voltage and current ratings. For example, such equipment may be suitable for 15 K.V. voltage, at a current rating, of for example, 1200-amperes, 2,000-amperes, and 3,000-amperes. The articular voltage and current rating supplied, of course, depends upon the requirements of the utility customer, and his particular needs and application of the equipment.

SUMMARY OF THE INVENTION

In accordance with the present invention, there is provided one or more pairs of side-by-side post-insulators for insulatingly supporting at least one longitudinally extending power-conductor assembly of the circuit breaker. Also, the two power-conductor assemblies of the circuit breaker may be laterally spaced-apart and rigidly held in proper position and alignment by means of a pair of side-by-side post-type insulators cooperating together and insulatingly supporting at least one of the power-conductor assemblies. Alternatively, both power-conductor assemblies may be laterally spaced apart by a pair of post-type insulators being in side-by-side relationship, either transversely of the power-conductor assembly or in alignment therewith. Moreover, an additional pair of side-by-side post-insulators may space one of the power-conductor assemblies from the grounded framework of the breaker.

BRIEF DESCRIPTION OF THE DRAWINGS

FIG. 13 is a fragmentary side-elevational view of the upper bus-bar conductor-assembly of FIG. 3;

FIG. 14 is a top plan sectional view of a 3000A rating taken substantially along the line XIV—XIV of FIG. 13;

FIG. 15 is a top plan sectional view of a modified-type of upper bus-bar conductor-assembly for a 2000A current rating to be substituted for the top power-conductor assembly of the circuit-interrupter of FIG. 3;

FIG. 16 is a top plan sectional view of a modified-type of upper bus-bar assembly for a 1200A current rating, to be substituted for the top power-conductor assembly of the circuit-interrupter of FIG. 3;

FIG. 17 is a top plan view of a still further modified-type of lower bus-bar conductor assembly of FIG. 3;

FIG. 18 is a side-elevational view of the lower bus-bar conductor assembly of FIG. 17 taken along the line XVIII—XVIII of FIG. 17;

FIG. 19 is a top plan view of a further modified-type of a lower bus-bar conductor assembly for FIG. 3;

FIG. 20 is a still further modified-type of lower bus-bar conductor assembly for FIG. 3;

FIGS. 29, 30 and 31 illustrate improved concepts of the lower bus-bar conductor-assembly of the present invention, FIG. 29 being a fragmentary front elevational view of the conductor-assembly of FIG. 30, and FIG. 31 being an end rear elevational view of the conductor-assembly of FIG. 30;

Figure 1:
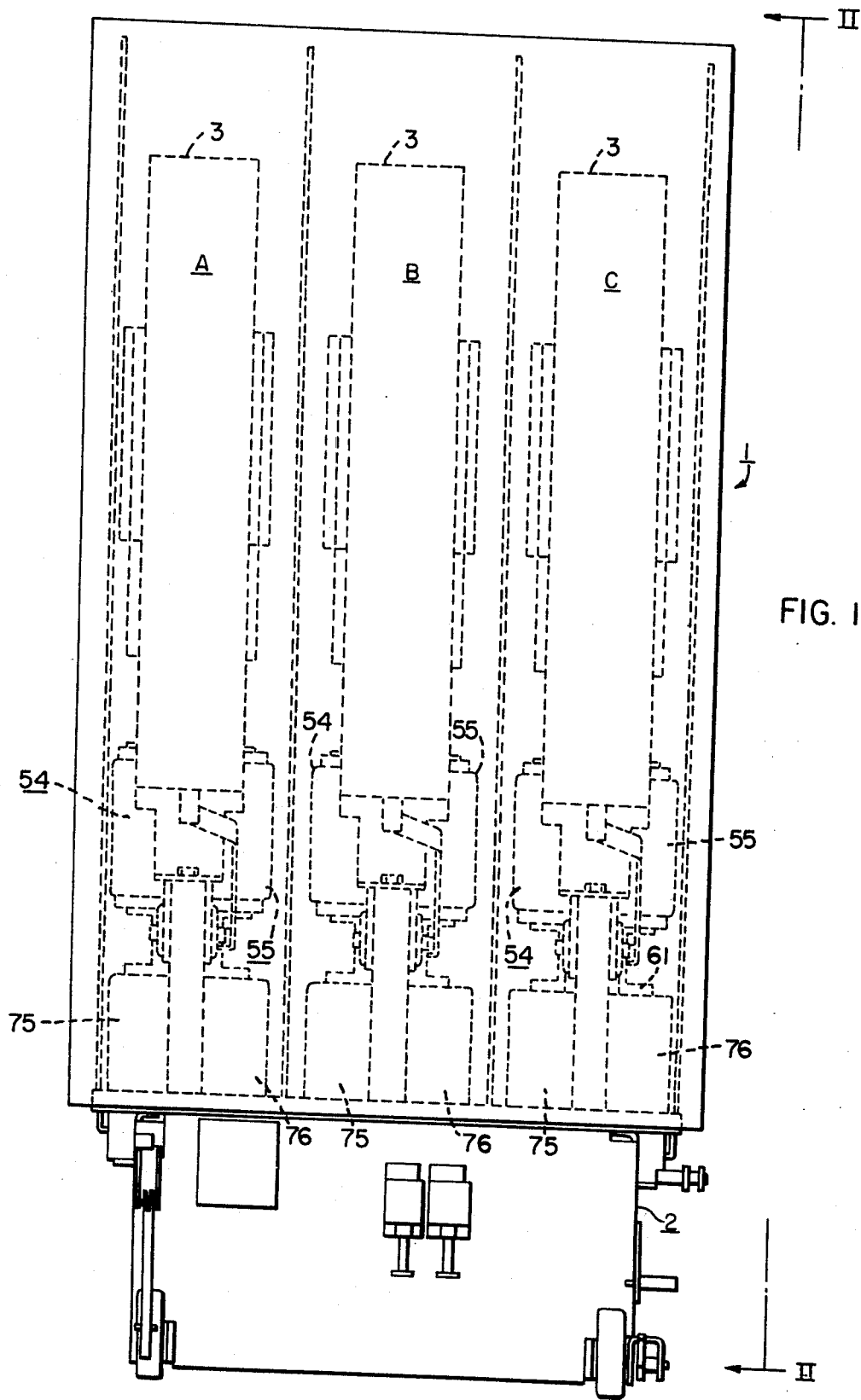
FIG. 1 is a front elevational view of a three-phase circuit-interrupter of the air-break type, adaptable for insertion into usual cubical-type switchgear.
Figure 2:
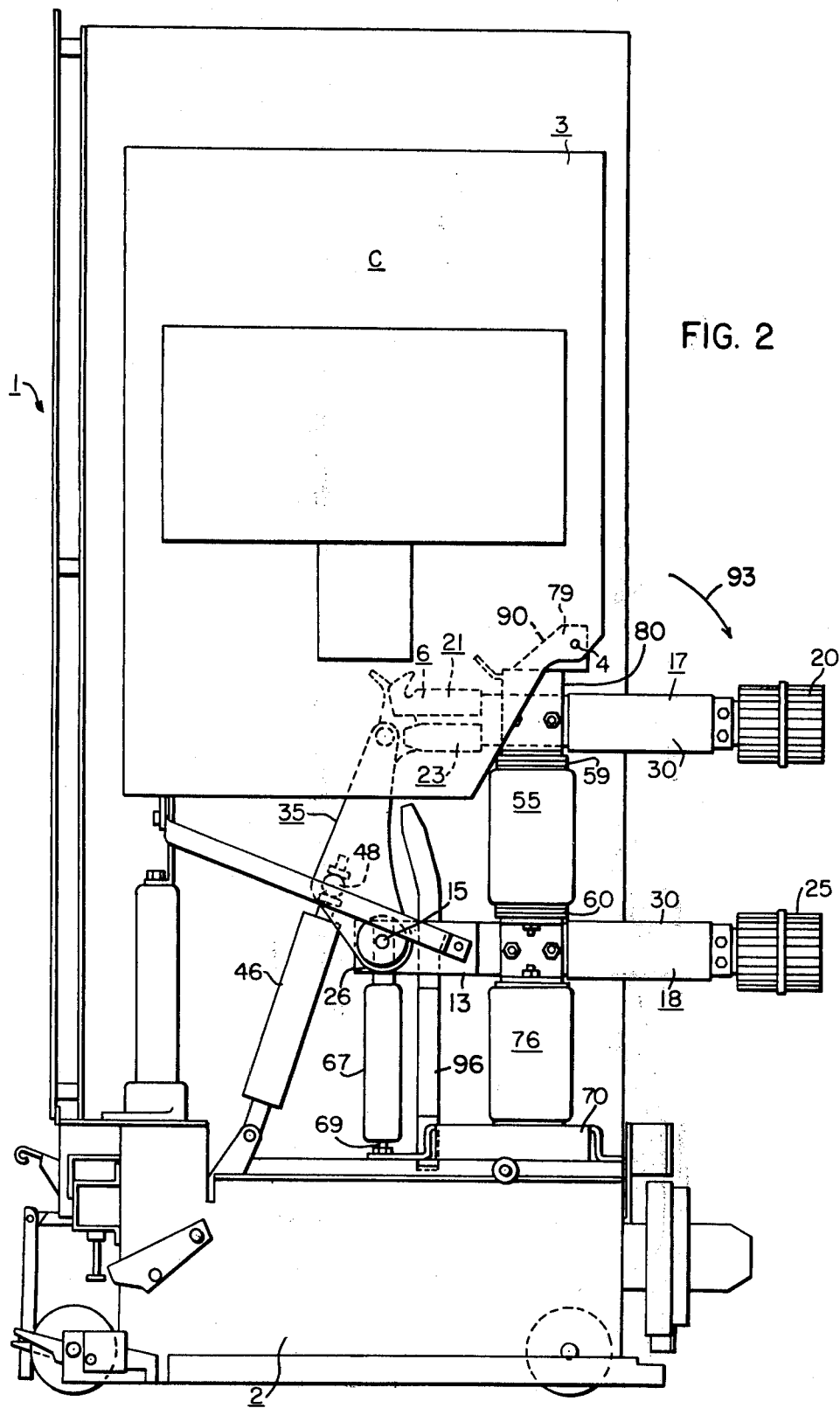
FIG. 2 is a side elevational view of the three-phase truck-mounted switchgear assembly of FIG. 1, the contact structure being illustrated in the closed-circuit position.
Figure 34:
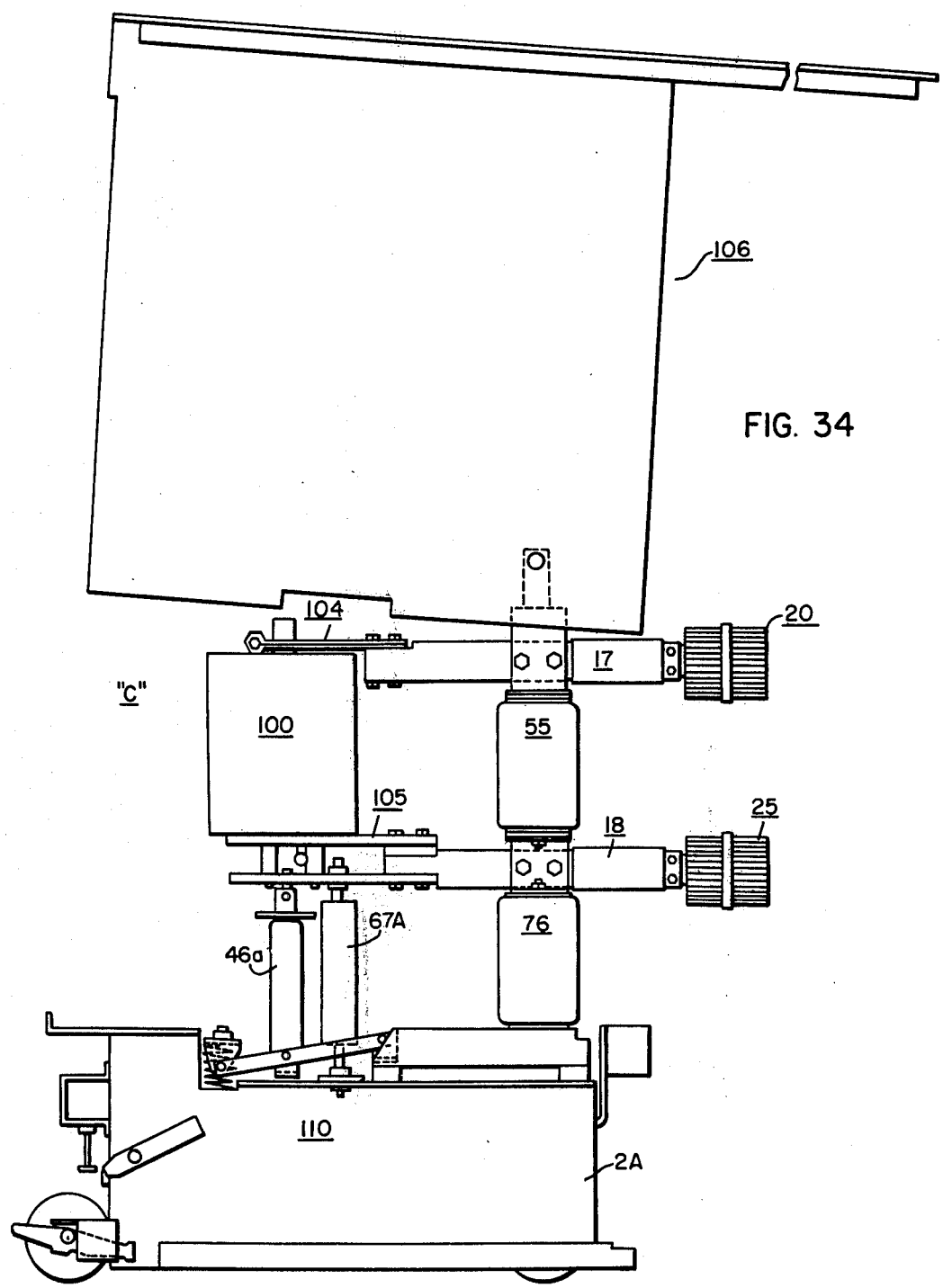

Comparison of FIGS. 32 and 33 illustrate improved constructional mounting concepts involved in the present invention, with FIG. 33 being a top plan view of a three-phase pole-unit assembly; and, FIG. 34 is a side elevational view of a modified-type of interrupter, in which a vacuum-interrupter unit is substituted for the rotating contact arm and arc-chute assembly of FIGS. 1 and 2.

DESCRIPTION OF THE PREFERRED EMBODIMENT

FIG. 1 is a front elevational view of a three-phase truck-mounted circuit-interrupter assembly, generally designated by the reference numeral 1 comprising three pole-units "A", "B" and "C", which are mounted upon a lower frame support 2, and adapted for rolling into a cubicle-type-switchgear cell structure, as well known by those skilled in the art. Reference may be had to FIGS. 35 and 37 of U.S. Pat. No. 3,590,188, issued June 29, 1971, to Frink et al, for additional understanding regarding the application of the truck-mounted switchgear 1 of FIGS. 1 and 2, regarding its use in cubicle-type metal-clad switchgear structure.

Referring to FIG. 2, it will be observed that each of the pole-units "A", "B" and "C" has its own arc-chute structure 3 associated therewith. Reference may be had to U.S. Pat. No. 2,889,433 — Kozlovic et al, for a description of the arc-chute structure 3 and its functioning. Generally, such arc-chute structure 3 rotates about a pivot-pin 4 supported toward the rear of the pole-unit "C", so that the entire arc-chute structure 3 may be rotated in a clockwise direction about the pin-support 4 to thereby enable a visual inspection of the separable contact structure, generally designated by the reference numeral 6.

It will be noted that unlike prior-art constructions, which have heretofore utilized round, solid, conductor-assemblies, in the improved circuit-interrupting structure 1 of my invention, I have utilized one or more rectangular metallic bars, such as indicated by the reference numerals 7–9 of FIG. 14. Thus, to adapt the equipment to various current ratings, such as, for example, 1200 amperes, 2000 amperes, and 3000 amperes, the material, of which the rectangular bars 7–9 are formed, may be varied, that is to say utilizing different conductivity materials, such as aluminum for the lower current-ratings, such as shown in FIG. 16, and copper for the higher current ratings, such as shown in FIG. 14. This material conductivity variation is clearly illustrated in FIGS. 13–16, FIG. 14 illustrating the 3000 ampere construction, FIG. 15 illustrating the 2000-ampere construction, and FIG. 16 illustrating the 1200 ampere rating.

In more detail, it will be observed that there is provided an upper bus-bar power conductor-assembly, generally designated by the reference numeral 17, and a lower power conductor bus-bar assembly, generally designated by the reference numeral 18, as more clearly illustrated in FIG. 2 of the drawings. Generally, the upper conducting bus-bar assembly 17 has affixed thereto adjacent its rear end a movable primary disconnecting contact structure, generally designated by the reference numeral 20, and adjacent its front end a stationary arcing contact structure 21, and stationary main contact finger structures 22 and 23, as more clearly shown in FIG. 7 of the drawings.

Generally, the lower bus-bar conductor-assembly 18 comprises primary disconnecting contact structure 25, situated at its rear end, and means providing a hinge-support 26 disposed adjacent its front end, as illustrated more clearly in FIGS. 17–20 of the drawings.

In all cases, it will be noted that, generally, the construction of the upper and lower power bus-bar conductor-assemblies comprises spaced bus-bar plates, which are spaced apart by spacers 28–30 as shown. In addition, each of the bus-bar plates is wrapped with an insulating layer 30 for electrical reasons, where the bus-bar conductor assemblies 17, 18 extend in a somewhat exposed relationship rearwardly of the arc-chute structure 1, as illustrated more clearly in FIG. 2 of the drawings.

Figure 3:
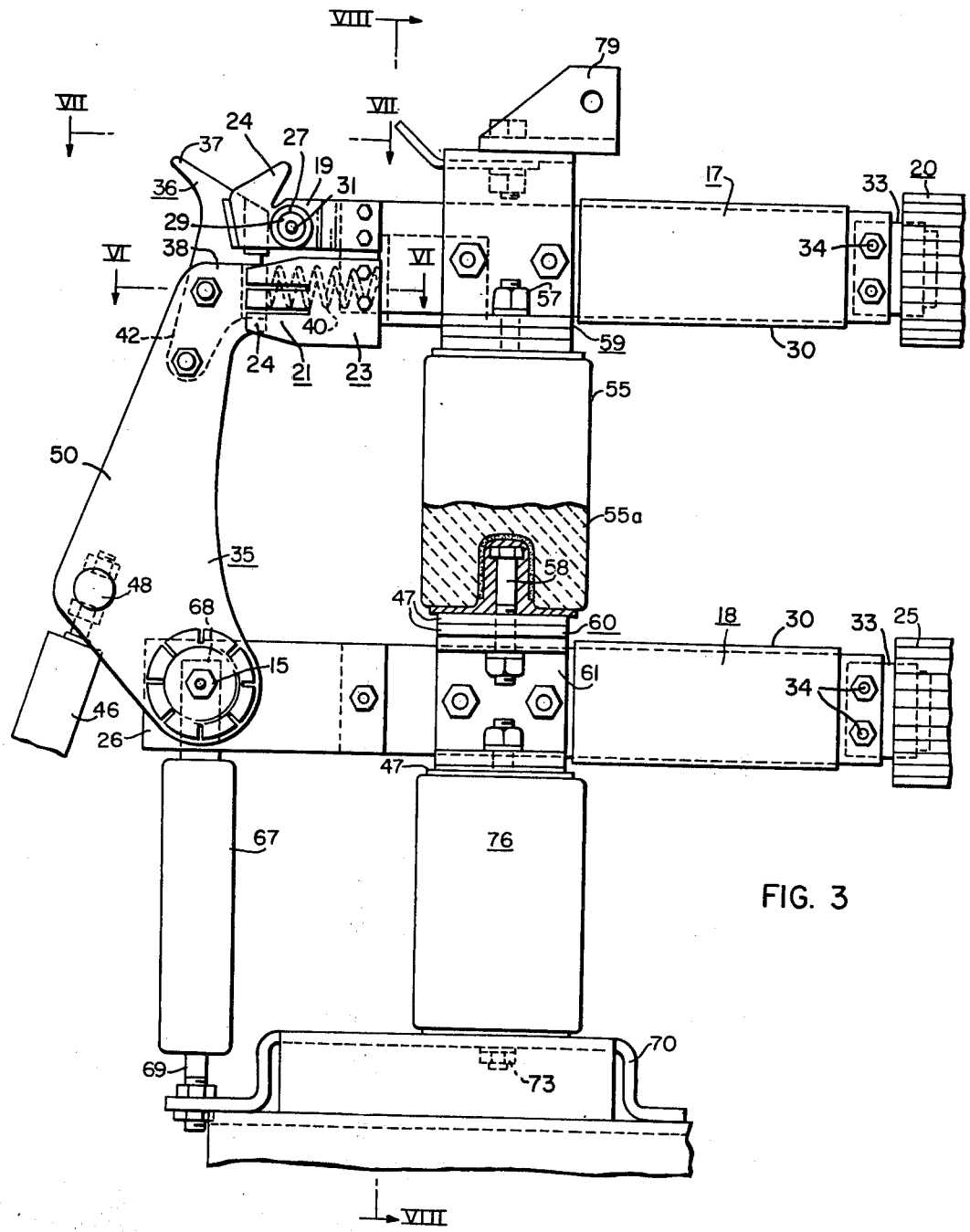
FIG. 3 is an enlarged side-elevational view, partially in vertical section, of one of the pole-units of the three-phase switchgear assembly of FIGS. 1 and 2, illustrating the contacts in the closed-circuit position.

With reference to FIG. 3, it will be observed that the moving contact-arm assembly, generally designated by the reference numeral 35, comprises one or more vertically-extending spaced conducting plate portions 50, 51, more clearly illustrated in FIGS. 4, 5, 6, 9 and 10 of the drawings, which will be described more fully hereinafter.

The lower-bus-bar power conductor-assembly 18 comprises, as was the case with the upper bus-bar power conductor assembly 17, a plurality of spaced plate-portions 11, 12 and 13. With reference to FIG. 17, for example, it will be noted that the outermost conducting plates 11 and 13 have pivot apertures 14 provided adjacent their front ends, to accommodate a pivot pin 15, more clearly illustrated in FIGS. 3 and 21 of the drawings. As well known by those skilled in the art, the pivot pin 15 accommodates opening and closing swinging rotative movement of the movable contact-arm assembly 35.

Figure 5:
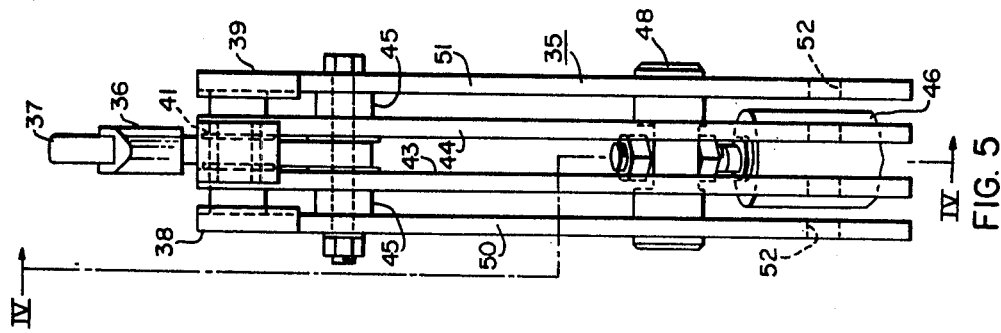
FIG. 5 is a rear elevational view of the rotatable moving contact-arm assembly of FIG. 4.
Figure 4:
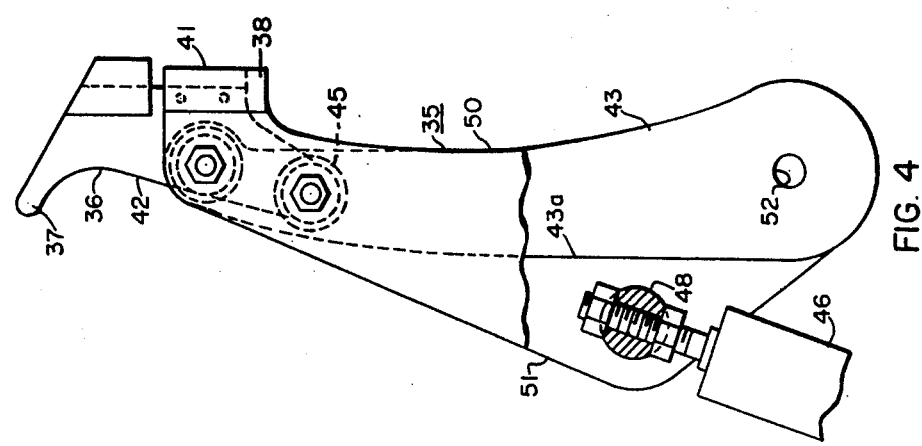
FIG. 4 illustrates the component parts of the rotatable moving contact-arm assembly of FIG. 3, and represents a sectional view taken along the line IV—IV of FIG. 5.
Figure 10:
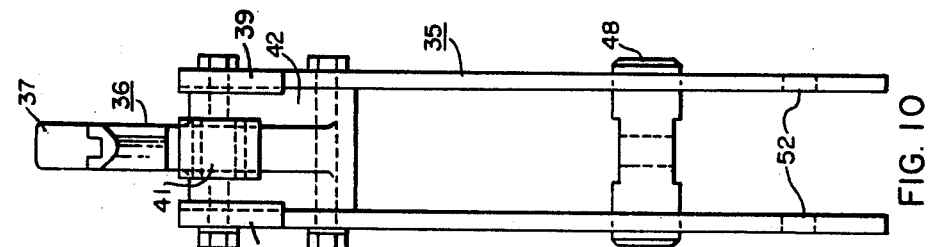
FIG. 10 is a rear elevational view of the rotatable movable contact-arm assembly of FIG. 9, taken substantially along the line X—X of FIG. 9, looking in the direction of the arrows.
Figure 9:
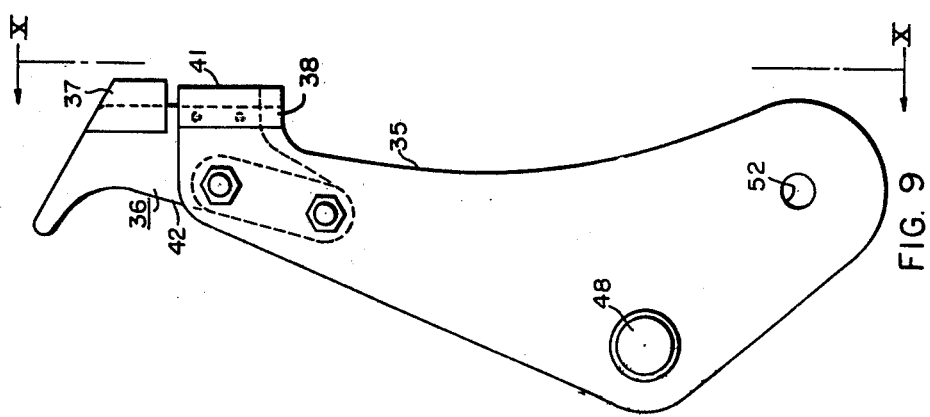
FIG. 9 is a side-elevational view of a component part of a moving contact-arm assembly of reduced current rating.

As was the case with the stationary contact structure, the outer free end of the rotatable moving contact-arm assembly 35 includes a centrally-located arcing contact 37, and two lateral adjacently-disposed main contacts 38 and 39, as more clearly illustrated in FIGS. 4 and 5 of the drawings.

In the case of the higher-current ratings, one or more additional intervening plate portions, such as the plates 43 and 44 (FIG. 5), may be utilized, being spaced by spacers 45 from the outer main pivotal plates 50, 51, which have apertures 52 provided through their lower ends to accommodate the pivot pin 15.

As will be obvious from an inspection of FIG. 3 of the drawings, it will be observed that the rectangular metallic bars 7–9 may be wrapped with insulation 30, the upper power conductor-assembly 17 supporting the primary disconnecting contact 20 at the rear end thereof. At the front end of the upper power conductor assembly 17 is fixedly secured the relatively stationary contact structure, generally designated by the reference numeral 19, and shown more clearly in FIGS. 3, 6 and 13 of the drawings.

In a somewhat similar manner, the lower power conductor-bus-bar assembly 18 supports the primary disconnecting contact assembly 25 at its rear end, and also provides a hinge-support 26 for the rotatable moving contact-arm assembly 35 at its front end. Supporting the upper or first, and the lower or second power conductor assemblies 17, 18 in vertical spaced-apart relationship is insulating post means, in this particular instance comprising a pair of laterally-disposed insulator-supports 54, 55 (FIG. 8) of the stand-off-insulator variety. Each of said insulator-supports 54, 55, as is illustrated in the sectional view of FIG. 3, comprises a pair of metallic mounting bolts 57, 58 cast into the insulator body 55a, so as to enable the bolts 57, 58 to fixedly secure the component hardware parts 59, 60 (FIG. 8) of the support-assemblies in the desired manner.

Figure 8:
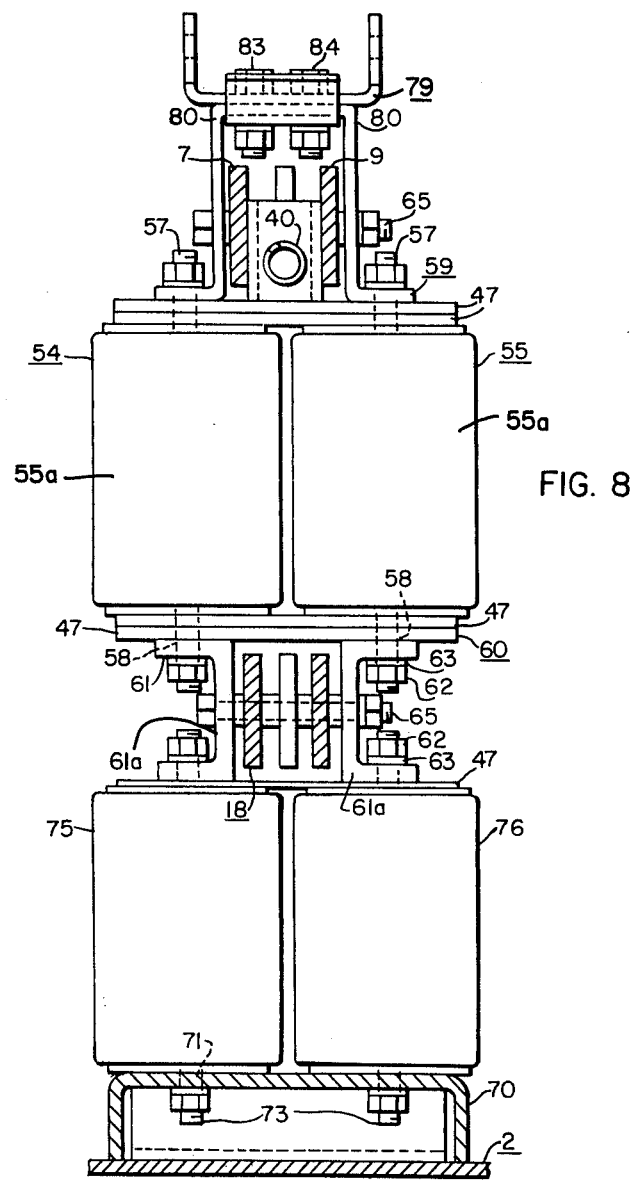
FIG. 8 is a fragmentary vertical sectional view, taken substantially along the line VIII—VIII of FIG. 3, looking in the direction of the arrows.

Channel-support members 61, as more clearly illustrated in FIG. 8 of the drawings, are located outwardly of the conductor assembly 18, and accommodate the ends of the mounting bolts 58 of the insulator supports 54, 55, nuts 62 being utilized, to provide a firm fixed assembly of the parts. In addition, the rectangular metallic conducting bars 7–9, 10–14, comprising the upper and lower power conductor-assemblies 17, 18 are fixedly secured by laterally-extending mounting bolts 65, extending laterally through the web portions 61a of the channel members 61. Again FIG. 8 illustrates this construction more clearly.

A lower metallic support base 70 is provided having apertures 71 therethrough to thereby accommodate the lower ends of the mounting bolts 73, extending through the lower set of porcelain standoff supports 75, 76, as likewise illustrated more clearly in FIG. 8. The several lower base-supports 70 of the three pole-units "A", "B" and "C" may be secured to the lower grounded supporting structure 2 in any suitable manner, as by mounting bolts 73, reference being had additionally to FIG. 2 in this connection.

As well known by those skilled in the art, the rotatable movable contact-arm assembly 35 is provided to effect the bridging closed contacting engagement between the relatively stationary contact structure 19 and the movable contact structure, 36 supported at the outer free end of the rotatable moving contact-support assembly 35.

Figure 6:
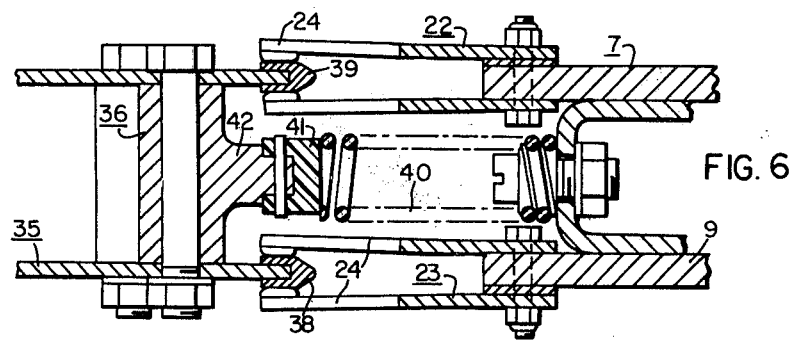
FIG. 6 is an enlarged plan sectional view taken substantially along the line VI—VI of FIG. 3 looking in the direction of the arrows.
Figure 11:
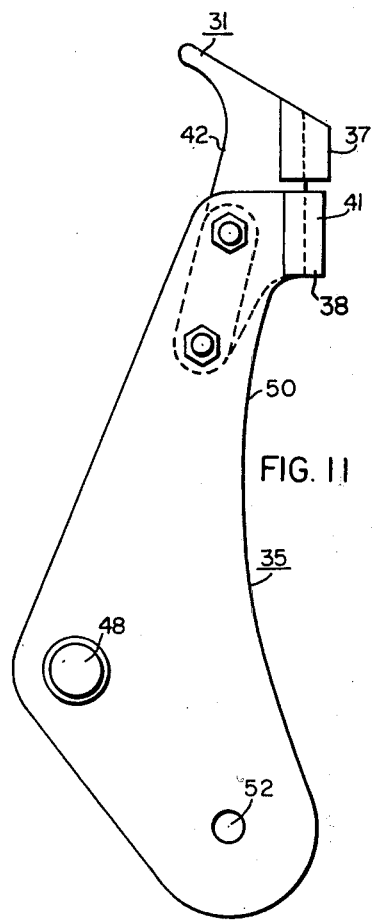
FIG. 11 is a side-elevational view of the moving contact-arm assembly.
Figure 12:
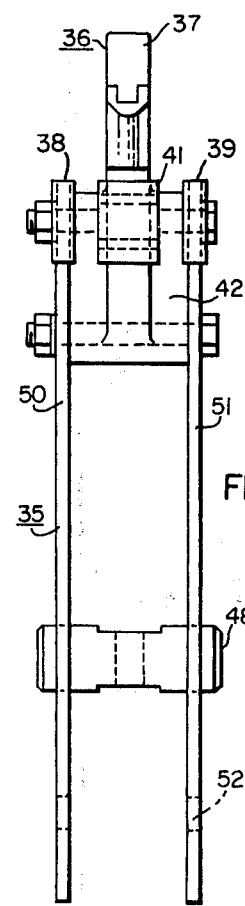
FIG. 12 is a rear elevational view of the movable contact-arm assembly of FIG. 11, taken substantially along the line XII—XII of FIG. 11.
Figure 7:
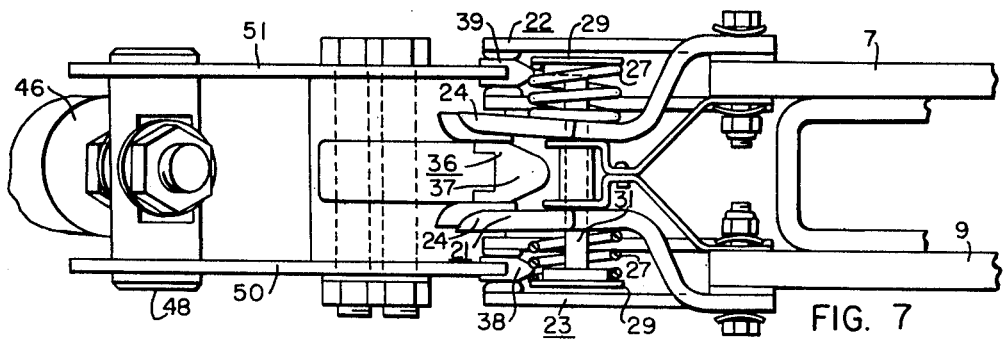
FIG. 7 is a top plan view taken substantially along the line VII—VII of FIG. 3, looking in the direction of the arrows.

With reference to FIGS. 3 and 7 of the drawings, it will be noted that the rotatable movable contact-arm assembly comprises a pair of outer conductor blade plates 50, 51, having main moving contacts 38, 39 disposed at their outer free ends, which make closing contacting engagement with spaced pairs of main stationary finger contacts 22, 23 supported at the inner ends of the outer-disposed bus-bar elements 7, 9, as shown in FIG. 7. The main stationary finger contacts 22, 23 are resiliently biased inwardly by the inherent flexibility of the contact fingers so as to make good contacting engagement with the two main movable contacts 38, 39 in the closed-circuit position, as shown in FIGS. 6 and 7.

In addition to the spaced outer main contacts 38, 39, there is provided a centrally-disposed arcing contact, designated by the reference numeral 37, which engages a pair of stationary arcing finger contacts 24, as illustrated more clearly in FIG. 7 of the drawings. The stationary finger contacts 24 are biased inwardly by a pair of aligned contact compression springs 27, disposed between the outer sides of the stationary finger contacts 24 and cap portions 29 provided on a through mounting bolt 31. Thus, the stationary arcing finger contacts 24 are biased into good contacting engagement with the main movable arcing contact 37 in the closed-circuit position of the device, as illustrated in FIGS. 3 and 7 of the drawings.

It will be observed that there is provided an accelerating spring 40, as more clearly shown in FIG. 6, which engages a moving insulating plug 41 pinned to a moving crossmember 42, provided adjacent the outer free end of the rotatable movable contact-arm assembly 35. Thus, the accelerating compression spring 40 assists in opening the movable contacts 38, 39.

FIGS. 4 and 5 illustrate a relatively high-current rating of the movable contact-arm assembly 35, whereas FIGS. 9–12 illustrate a lower current rating. It will be noted that on the lower-current ratings, there are only provided the two outer conducting blades 50, 51, which are adequate for the lower-current ratings. However, in the case of the higher-current ratings, the addition of the intervening conducting plates 43, 44, more clearly shown in FIG. 5, are additionally provided for the extra current-carrying capability required.

Again, FIGS. 4 and 5 show more clearly the pivot pin 48 pivotally connecting the movable operating rod 46, it being noted that a segmental portion 43a, 44a of the two intervening plates 43, 44 is eliminated to provide clearance for the rotating movement of the upper end of the movable operating rod 46 in its opening and closing movements. This enables a close spacing to be provided between the outer plates 50, 51, and, consequently, the same arc chute 3 may be employed, as has been supplied in the prior-art pole-units having a lower current rating.

To provide additional rigidity for the hinge support 26, an insulating hinge-support rod 67 is provided, as more clearly illustrated in FIGS. 2 and 3 of the drawings. It will be observed that again, preferably, the hinge-support rod 67 is of insulating material having stud-portions 68, 69 cemented into the upper and lower-end cavities thereof, in a manner similar to that utilized by the bolts 57, 58 cemented in the cavities provided in the stand-off insulators 55, as more clearly illustrated in FIG. 3 of the drawings. The lower stud 69 of the hinge-support 67 may be secured by any suitable means to the lower base support 70, as shown more clearly in FIGS. 2 and 3. The upper end-stud portion 68 may have an aperture therethrough, through which the pivot pin 15 may pass, the construction being more clearly shown in FIG. 3 of the drawings. Thus, there is provided additional support for the hinge-support structure 26 for the rotatable movable contact-arm assembly 35.

As shown more clearly in FIGS. 13 and 14 of the drawings, it will be observed that the movable primary disconnecting contacts 20, 25 cooperate with a solid coupling plug member 33, which may be so machined that by the addition of a bolt 34, proper spacing and support is provided for the ends of the bus-bar elements 10-14 and the elements 7, 8, 9 associated with the upper power conductor-assembly 17. FIGS. 14 and 17 may be referred to in this connection.

With reference to FIGS. 3 and 13 of the drawings, it will be observed that a hinge-support structure 79 is provided for pivotal swinging movement of the upper arc chute structure 3, as more clearly illustrated in FIG. 34 of the drawings. Generally, the arc chute support structure 79 comprises a pair of "Z" metallic elements 80, which are secured by the bolts 57 (FIG. 8), and have their upper ends come in close engagement, as at 81. Bolts 83 and 84 cooperate with the upper flange portions 80a of the "Z" elements 80, and additionally secure a channel hinge-element 90, having the pivot aperture 4 therethrough to accommodate a pivot pin, thus enabling rotative movement of the arc chute structure 3, as indicated by the arrow 93 of FIG. 2 of the drawings.

As well known by those skilled in the art, to assist in interrupting low value currents, where the magnetic effect provided in the arc chute structure 3 is weak, a blast of air is provided through a puffer tube 96, more clearly illustrated in FIG. 2 of the drawings. The functioning and theory regarding the blast tube is set forth in U.S. Pat. No. 2,734,971 — Lingal et al., should it be of interest.

The present invention is not exclusively concerned with an arc-chute structure, such as the one designated by the reference numeral 3 in FIG. 2 of the drawings, and described in the aforesaid U.S. Pat. No. 2,889,433, but the present invention has applicability, where desired, to vacuum-interrupter elements, such as set forth in U.S. patent application filed Nov. 15, 1972, Ser. No. 306,669, now U.S. Pat. No. 3,793,494, issued Feb. 19, 1974 to Charles M. Cleaveland, and assigned to the assignee of the instant application.

With reference to FIG. 34 of the drawings, it will be observed that a vacuum-interrupter element 100 has been substituted for the arc-chute 3 and rotating contact arm structure 35 as illustrated in FIG. 2. It will be observed that again the upper and lower power conductor bus-bar assemblies 17 and 18 may be employed, having supporting structure 104, 105 secured adjacent the inner ends of the power conductor bus-bar assemblies 17, 18 to fixedly secure the vacuum-interrupter element 100 in the proper location. An operating-rod structure 46a may interconnect the operating mechanism 110 with a movable contact structure, which reciprocally operates within the interrupter element 100 interiorly thereof. Thus, the present invention may be utilized with various types of interrupting assemblies, where desired. The structure of FIG. 34 is set forth and claimed in U.S. patent application, Ser. No. 466,746, filed May 3, 1974, by Charles M. Cleaveland, and assigned to the assignee of the instant patent application.

Figures 21, 22, 23:
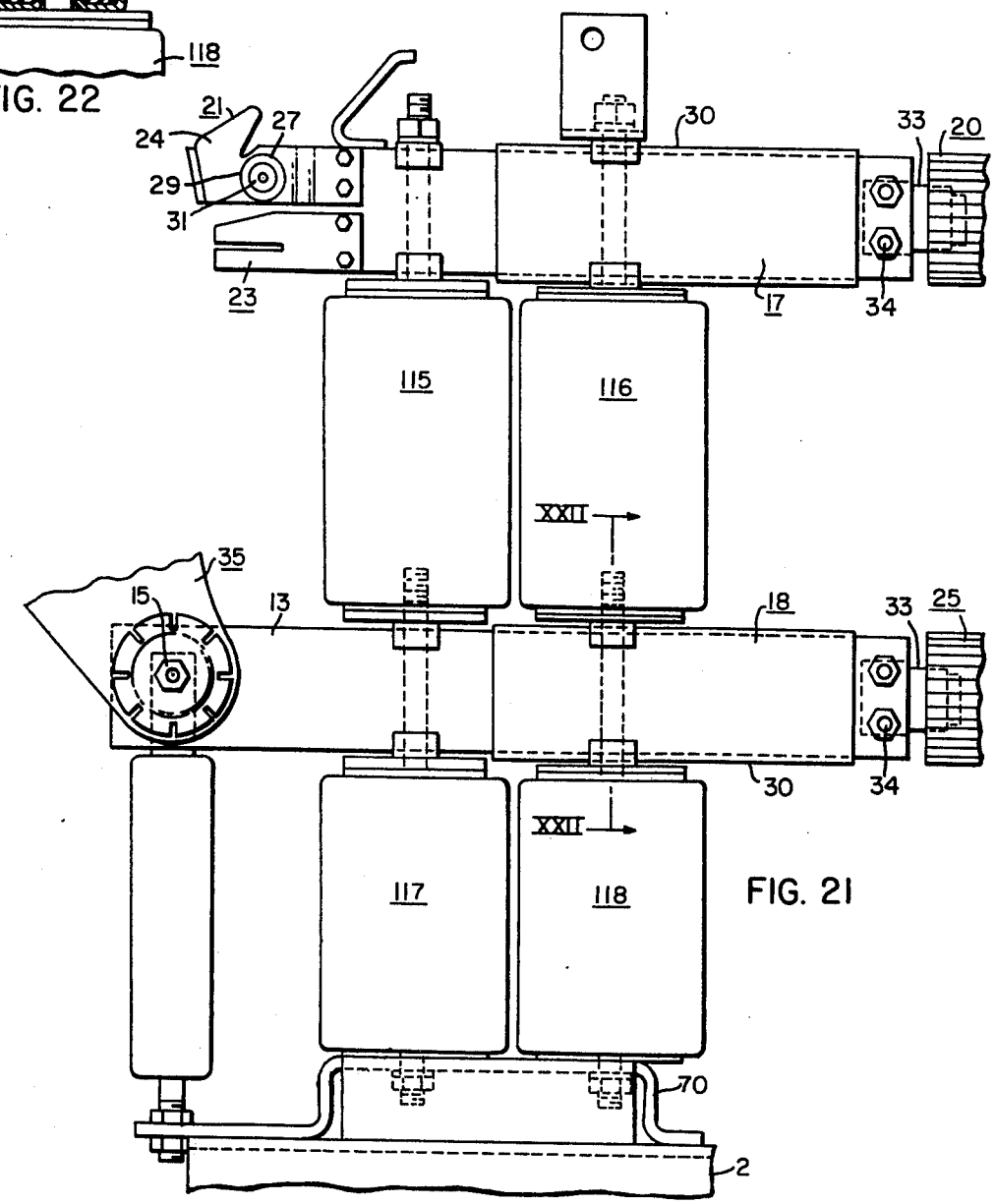
FIG. 21 illustrates a side-elevational view of a modified-type of supporting assembly, in which the stand-off insulating supports are disposed in front of one another, as contrasted with the situation in which they are in side-by-side laterally-disposed relationship, as illustrated in FIG. 1 and 2 of the drawings.
FIG. 22 is a fragmentary vertical sectional view taken substantially along the line XXII—XXII of FIG. 21 looking in the direction of the arrows.
FIG. 23 is an enlarged plan view of a supporting metallic spacer, assisting in mechanically connecting two stand-off insulator supports together.
Figure 24:
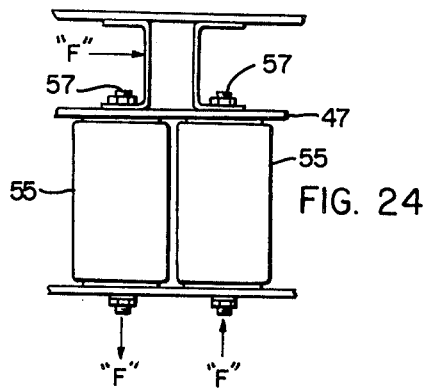
FIG. 24 illustrates the phase-to-phase bending forces and reactions encountered during high current conditions in a pair of stand-off insulators, where the two are disposed in laterally side-by-side relationship, as illustrated in FIGS. 1 and 2 of the drawings.

Although FIGS. 1 and 2 illustrate the stand-off insulators 54, 55 in lateral side-by-side arrangement, as illustrated in FIG. 8, nevertheless, where desired, the stand-off insulator assemblies 54, 55, 75, 76 may be arranged in front of each other, as more clearly shown in FIGS. 21 and 22 of the drawings. With reference to FIGS. 21 and 22, it will be observed that stand-off insulators 115, 116, 117 and 118 are disposed in front of each other, as viewed when looking into the arc-chute structure, as, for example, looking into the drawing of FIG. 1. This provides additional support, where desired.

Figure 25:
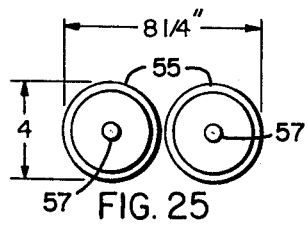
FIGS. 25 and 26 are diagrammatic views illustrating the saving in space (in the vertical direction) with again nearly twice the cantilever bending strength, as a result of using two stand-off insulator supports laterally, instead of one large conventional stand-off insulator support as in FIG. 26.
Figure 26:
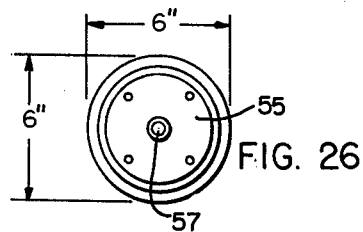

The new stand-off insulator concept is technically possible now by preferably using insulators 54, 55, 75, 76 in pairs. These pairs of insulators are stronger than one large single insulator with the same section area. If the force is applied to the insulator pair so as to cause bending or cantilever loading, one insulator will be in tension and the other in compression. Porcelain is very strong in compression and moderately strong in tension and because the insulators are separate, the applied cantilever force to break the porcelain is higher since there is no shear stress between the pairs where there would be with the two porcelains connected together. The strength in bending of each single insulator by itself is about 17,900 in No. but when tied together in pairs with metallic end plates the strength is more than doubled and is about 40,920 in No. as shown in FIGS. 25 and 26. This helps to attain the requires strength to handle the high momentary currents, phase-to-phase. In lower short circuit current applications the force from the mechanism that operates the breaker 1 may be the highest force and then it may be desirable to orient the pair of insulators to withstand the force in that direction.

Porcelain insulators were not used in the past because there was not physical room for one single insulator that would be large enough to withstand the forces and no one thought of using two smaller insulators in pairs (FIG. 25) that have a higher area moment in the direction needed. The pair of insulators with single bolt fastening on the ends is less expensive than the A-30 type as shown in FIG. 26. $9. a pair versus $14. for one A-30. In addition, it takes more than one A-30 to be of equal strength. Because the single bolt termination on the end of the stand-off requires a comparatively small hole in the porcelain for babbit, it has more wall thickness than the A-30 type and consequently more strength is achieved.

Figure 27:
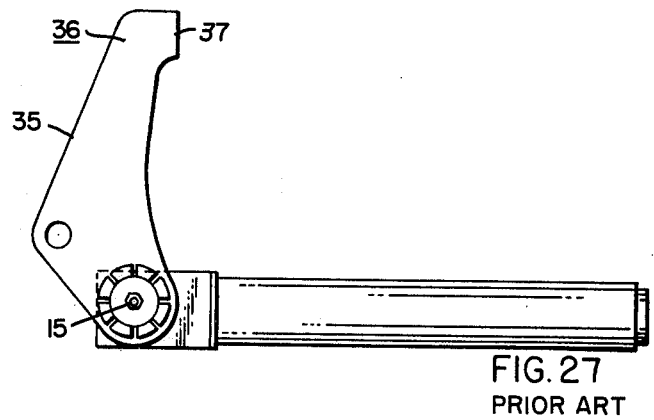
FIGS. 27 and 28 illustrates a comparison between conductor assemblies utilizing a round solid conductor stud as in FIG. 27, as opposed to the spaced bus-bar conductor-assembly, as set forth in the instant invention and shown in FIG. 28.
Figure 28:
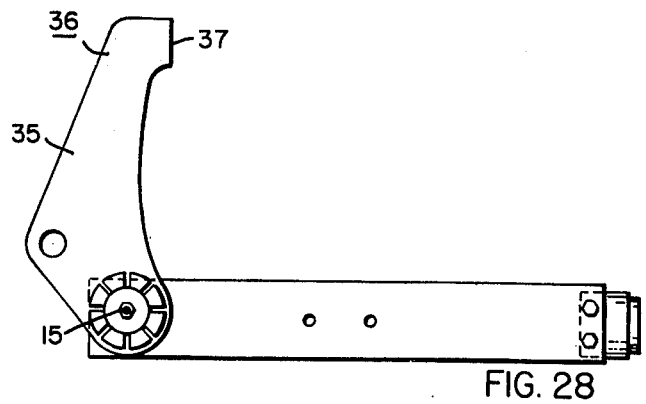

The construction disclosed in FIGS. 30 and 31 has a versatile conductor arrangement and several advantages. Since the conductors are flat bars, the breaker blades can pivot directly on the bars as shown in FIG. 28 without the conventional transition from customary round conductors to a casting or extrusion with flat surfaces as shown in FIG. 27. The flat bars are put in multiples and air can paass through them for better cooling as shown in FIG. 15 and by adding the correct number of bars, the current rating can be picked or changed in the field.

Also the construction disclosed in FIG. 32 is "open" and the conductors and conductor support pieces can cool by convection to the air. The old pole unit FIG. 33 and those of our competitors are "closed" and the conductors are covered with porcelain or deep within cast epoxy or polyester.

Since there is no brazing, the conductors can be aluminum most of their length and can be copper (by bolting) only where there are sliding contacts at each end. In detail: All copper aluminum joints are silver plated and bolted. This construction is new to breakers, especially the copper shim A on FIGS. 29, 30 at the hinge joint upon which the blades can rotate. It is not acceptable to rotate on aluminum.

Upper bar conductors use shims B on FIG. 6, but only as spacers when bar thickness changes with different current ratings. The spacers keep the contact finger spacing constant and makes fingers and blade contacts standard for different current ratings. Past practice says not to use spacers because they add contact resistance. New construction is able to get by without a polyester bar tieing all three phases together as all breakers do now.

The new construction using stand-off insulators has another feature that may account for its outstanding performance under high momentary current force: Since the insulators are coupled together by metallic pieces 60 and 61 on FIG. 3 that are somewhat flexible, the shock transmitted to the porcelain is less than with our old design with one huge piece of porcelain and conductors within.

From the foregoing description, it will be apparent that there has been provided an improved air-break circuit-interrupting construction 1, in which considerable duplication of parts for various current ratings is possible, because of the use of insulating post means, such as, for example, the pairs of standoff insulators 54, 55, 76, which are the same regardless of the current rating of the device. Since the length of the standoff insulators 54, 55, 76 is wholly dependent upon the voltage rating of the device, volume production is thereby made possible, with only differences in the number and material of the bus-bar plates 7, 8, 9, 11, 12, 13 provided for the upper and lower conductor assemblies 17, 18, as set forth hereinabove.

In addition, the rotatable moving contact-arm assembly 35 is likewise adaptable for various current ratings, and again comprises a number of rectangular plate-like elements 50, 51, which may have intervening additional conductor blade 43, 44 for the higher current ratings.

Although there has been illustrated and described specific structures, it is to be clearly understood that the same were merely for the purpose of illustration, and that changes and modifications may readily be made therein by those skilled in the art, without departing from the spirit and scope of the invention.

I claim:

1. The combination in a circuit-breaker structure of a pair of longitudinally-extending spaced power-conductor assemblies, each of said spaced power-conductor assemblies having a stationary contact means disposed adjacent an end thereof, movable contact means for electrically interconnecting said two stationary contact means, one or more pairs of side-by-side post-insulator supports disposed between said spaced power-conductor assemblies for supporting said power-conductor assemblies apart, said one or more pairs of side-by-side post-insulator supports being generally parallel to one another and extending in the same general direction, said one or more pairs of side-by-side post-insulator supports additionally being closely spaced next to each other and mechanically rigidly interconnected at at least one end thereof for combined strength and rigidity of support.

2. The combination according to claim 1, wherein the pair of side-by-side post-type insulator supports are in front of each other, that is, in general alignment with the longitudinally-extending power-conductor assemblies.

3. The combination according to claim 1, wherein the pair of side-by-side post-insulator supports are disposed laterally-arranged in side-by-side disposition, that is, being disposed transversely of the longitudinal direction of the longitudinally-extending power-conductor assemblies.

4. The combination according to claim 1, wherein an additional supporting means comprising a framework structure is utilized to support the said pair of longitudinally-extending spaced power-conductor assemblies, and an additional pair of side-by-side close-spaced post-insulator supports extends upwardly from said framework structure supporting at least one of said pair of longitudinally-extending spaced power-conductor assemblies.

5. The combination according to claim 1, wherein said one or more pairs of side-by-side post-insulator supports are disposed in generally vertical spaced relationship, that is, generally disposed in a vertical plane, whereby the pair of longitudinally-extending spaced power-conductor assemblies are disposed one above the other in a vertical plane.

6. The combination according to claim 1, wherein a metallic plate bridges at least one end of said post-type insulator supports.

7. The combination in metal-clad switch gear of a roll-in-type truck-mounted circuit-breaker structure including separable contact means for establishing an arc, said circuit-breaker structure including a pair of longitudinally-extending spaced power-conductor assemblies, each of said spaced power-conductor assemblies having a stationary contact means disposed adjacent an end thereof, movable contact means for electrically interconnecting said two stationary contact means, one or more pairs of side-by-side post-insulator supports disposed between said spaced power-conductor assemblies for supporting said power-conductor assemblies apart, said one or more pairs of side-by-side post-insulator supports being generally parallel to one another and extending in the same general direction, said one or more pairs of side-by-side post-insulator supports additionally being closely spaced next to each other and mechanically rigidly interconnected at at least one end thereof for combined strength and rigidity of support.

8. The combination according to claim 7, wherein movable primary disconnecting contacts are disposed adjacent the rear ends of the pair of longitudinally-extending spaced power-conductor assemblies.

9. The combination according to claim 7, wherein an additional lower-disposed supporting means is provided, and an additional pair of side-by-side post-insulator supports insulatingly support at least one of said longitudinally-extending power-conductor assemblies from said lower-disposed supporting means.

10. The combination according to claim 9, wherein a pair of channel metallic members are disposed at the upper ends of the last-mentioned pair of side-by-side post-insulator supports.

11. The combination according to claim 7, wherein the pair of side-by-side post-insulator supports are in front-to-back arrangement, that is, generally in alignment with the longitudinally-extending pair of spaced power-conductor assemblies.

12. The combination according to claim 7, wherein the pair of post-type insulator supports are arranged in generally laterally-disposed side-by-side relationship that is disposed generally transversely of the longitudinal direction of the pair of spaced power-conductor assemblies.

* * * * *